United States Patent

Yoneda et al.

[15] 3,673,195
[45] June 27, 1972

[54] DERIVATIVES OF 6,6,9-TRI-LOWER ALKYL-9-AZABICYCLO(3.3.1) NONAN-3α-OR 3β-OL

[72] Inventors: Naoto Yoneda; Teruo Ishihara; Tetsuji Kobayashi; Yasuzo Kondo, all of Osaka; Kentaro Okumura, Kobe; Michio Kojima, Nara; Takashi Nose, Osaka, all of Japan

[73] Assignee: Tanabe Swiyaku Co., Ltd., Osaka, Japan

[22] Filed: May 25, 1970

[21] Appl. No.: 40,394

[52] U.S. Cl............................260/293.54, 424/267
[51] Int. Cl.....................C07d 39/00, C07d 99/06
[58] Field of Search.............................260/293.54

[56] References Cited

UNITED STATES PATENTS 3,184,467  5/1965  Dold et al. .........................260/294.3
3,261,841  7/1966  Zenitz................................260/292

Primary Examiner—Henry R. Jiles
Assistant Examiner—G. Thomas Todd
Attorney—Bierman & Bierman

[57] ABSTRACT

Compounds useful in treating Parkinson's disease have the general formula:

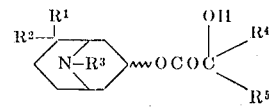

$R^1$, $R^2$ and $R^3$ are lower alkyl radicals. $R^4$ and $R^5$ are phenyl, cyclohexyl and thienyl radicals. Pharmaceutically acceptable acid addition salts of these compounds are also within the scope of the invention.

A 6,6,9-tri-lower alkyl-9-azabicyclo[3,3,1]nonan-3α and/or 3β-ol having the formula:

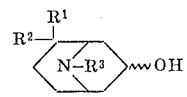

wherein $R^1$, $R^2$ and $R^3$ are as defined above is reacted with an acylating agent which may form an acyl radical having the formula:

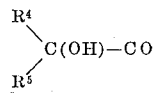

wherein $R^4$ and $R^5$ are as defined above.

14 Claims, No Drawings

DERIVATIVES OF 6,6,9-TRI-LOWER ALKYL-9-AZABICYCLO(3.3.1) NONAN-3α-OR 3β-OL

This invention relates to novel derivatives of 6,6,9-tri-lower alkyl-9-azabicyclo [3,3,1] nonan-3α and/or 3α-ol and a process for preparing same.

The 6,6,9-tri-lower alkyl-9-azabicyclo [3,3,1] nonan-3α and/or 3α-ol derivatives of the present invention are represented by the formula:

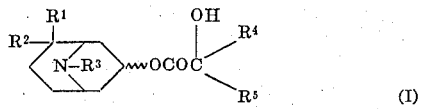

wherein $R^1$, $R^2$ and $R^3$ are lower alkyl radicals, $R^4$ and $R^5$ are radicals selected from the group consisting of phenyl, cyclohexyl and thienyl radicals, and a pharmaceutically acceptable acid addition salt thereof.

It has been found that the above-mentioned novel derivatives (I) and their acid addition salts are useful as anti-parkinsonian agents. For example, the compounds of the present invention have therapeutically useful characteristics such as anti-physostigmine and anti-tremorine activity. Their therapeutic activity is comparable or superior to that of atropine sulfate and trihexyphenidyl hydrochloride. In particular, the α,α-di-(2-thienyl)-glycollate of 6,6,9-trimethyl-9-azabicyclo [3,3,1] nonan-3α-ol(hydrochloride) exhibits an anti-physostigmine and anti-tremorine activity about three times that of tri-hexyphenidyl hydrochloride. The anti-physostigmine activity (=$ED_{50}$) of the compound which would protect mice from physostigmine-induced death by 50 percent when administered to male adult mice intraperitoneally 30 minutes before the interperitoneal administration of 2 mg/kg of physostigmine is about 2.2mg/kg, while the $ED_{50}$ of trihexyphenidyl hydrochloride is about 6.2 mg/kg. Alternatively, the anti-tremorine activity (=$ED_{50}$) of the compound which would protect mice from tremorine-induced tremor by 50 percent when administered to male adult mice intraperitoneally 30 minutes before the intraperitoneal administration of 15 mg/kg of tremorine is about 0.5 mg/kg, while the $ED_{50}$ of trihexyphenidyl hydrochloride is about 1.5 mg/kg.

The compounds of the present invention also have a potent cholinolitic action. For example, the α,α-di-(2-thienyl)-glycollate of 6,6,9-trimethyl-9-azabicyclo [3,3,1] nonan-3β-ol(hydrochloride) exhibits almost the same cholinolitic activity as that of trihexyphenidyl hydrochloride in the pharmacological test using isolated guinea pig ileum. Moreover, side effects of the compounds such as mydriasis and thirst are relatively less as compared with trihexyphenidyl hydrochloride.

Additionally, the toxicity of the compounds (I) is relatively low. For example, when administered orally in mice, the acute toxicity (=$LD_{50}$) of the benzilate of 6,6,9-trimethyl-9-azabicyclo [3,3,1] nonan-3β-ol(hydrochloride) is about 263 mg/kg.

According to the present invention, a compound of the formula (I) can be prepared by reacting 6,6,9-tri-lower alkyl-9-azabicyclo [3,3,1] nonan-3β and/or 3β -ol represented by the formula:

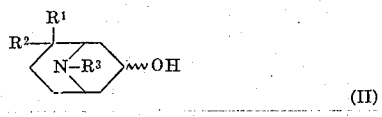

wherein the symbols are as defined above, with an acylating agent which may form an acyl radical having the formula:

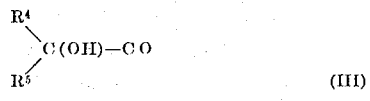

wherein $R^4$ and $R^5$ are each as defined above.

The starting compound (II) is readily obtainable. For example, it may be produced by condensing α,α-di-lower alkyl-glutaraldehyde, acetonedicarboxylic acid and lower alkylamine, and by reducing the resultant 6,6,9-tri-lower alkyl-9-azabicyclo [3,3,1] nonan-3-one.

The preferred acylating agents include, for example, α,α-disubstituted glycollic acid such as benzylic acid, α-phenyl-α-(2-thienyl)-glycollic acid, α-phenyl-α-cyclohexyl-glycollic acid, α-(2-thienyl)-α-cyclohexyl-glycollic acid, or their lower alkyl esters such as methyl esters, their thiosulfates, anhydrides, or the corresponding acyl chlorides.

Preferred examples of the starting compound (II) include 6,6,9-trimethyl-, 6,6-dimethyl-9-ethyl, 6,6-diethyl-9-methyl-, 6,6-dimethyl-9-propyl-, 6,6-dimethyl-9-butyl-, and 6,6,9-triethyl-substituted derivatives of 9-azabicyclo [3,3,1] nonan-3-ol.

The esterification reaction of the present invention can be conventionally accomplished. For example, when an acyl halide or an acyl anhydride is used as the acylating agent (III), the reaction is preferably carried out at room temperature or with moderate heating in the presence of a base (e.g., pyridine, triethylamine, etc.). Alternatively, the reaction can be carried out without the addition of such base when compound (II) is employed in an amount which is more than two times the molar amount of the acylating agent. Chloroform, dichloromethane, benzene, toluene, dimethylformamide and a base such as pyridine are suitable reaction solvents.

When an ester is used as the acylating agent (III), the reaction can be carried out by heating under reduced pressure. In particular, it is preferably carried out in the presence of an alkali metal (e.g., metallic sodium) or an alkali metal hydride (e.g., sodium hydride).

Alternatively, when a free carboxylic acid is used as the acylating agent (III) the reaction can be carried out at room temperature, in the presence of a dehydrating agent (e.g., dicyclohexyl-carbodiimide) and in a suitable solvent (e.g., pyridine, dimethylformamide).

The compound (I) thus obtained can be employed for pharmaceutical use either as the base or its salt. The base and its salt are readily interconvertible by conventional manner. Examples of therapeutically acceptable salts include salts formed by reacting the base with an inorganic acid, as for example, hydrochloric acid, hydrobromic acid, nitric acid, sulfuric acid or phosphoric acid; or an organic acid, as for example, formic acid, acetic acid, propionic acid, glycollic acid, lactic acid, pyruvic acid, oxalic acid, succinic acid, maleic acid, fumaric acid, malic acid, citric acid, tartaric acid, ascorbic acid, hydroxymaleic acid, benzoic acid, phenylacetic acid, aminobenzoic acid, methanesulfonic acid, ethanesulfonic acid, benzenesulfonic acid, p-toluenesulfonic acid, sulfanilic acid, aspartic acid or glutamic acid. Furthermore, the compound (I) may be incorporated within a pharmaceutical preparation in conjunction with or admixed with a pharmaceutical excipient that is suitable for enteral or parenteral administration. Excipients which do not react with the compound (I) should be selected. Gelatin, lactose, glucose, sodium chloride, starch, magnesium stearate, talcum, vegetable oil, benzyl alcohol, and gums are suitable. Other known medicinal excipients may be employed. The pharmaceutical preparation may be, for example, a solid dosage form such as a tablet, a coated tablet, a pill or a capsule; or a liquid dosage form such as, for example, a solution, a suspension or an emulsion.

The pharmaceutical preparation may be sterilized and/or may contain auxiliaries, such as preserving, stabilizing, wetting or emulsifying agents. The pharmaceutical preparation may further contain other therapeutically valuable substances.

Practical and presently-preferred embodiments of the present invention are illustratively shown in the following Examples.

EXAMPLE 1

40 mg of metallic sodium is added to a mixture of 1.5 g of 6,6,9-trimethylg9-azabicyclo [3,3,1] nonan-3α-ol and 3.6 g of methyl benzilate. The mixture is heated at 120° – 130° C. for 4 hours under reduced pressure. The mixture is further heated at the same temperature for 4 hours under reduced pressure. After cooling, the mixture is dissolved into ether. The ether solution is shaken with 10 percent hydrochloric acid and the crystals which precipitate are collected by filtration. 2.6 g of the benzilate of 6,6,9-trimethyl-9-azabicylo [3,3,1] nonan-3α-ol hydrochloride are obtained. Yield: 73 percent The crystals thus obtained are recrystallized from a mixture of methanol and ether to give colorless fine needles. M.p. 231° C. (decomp.)

Infrared absorption spectrum (in nujol)
    3250 cm$^{-1}$(OH), 1735 cm$^{-1}$ (ester)
Analysis calculated   for $C_{25}H_{32}NO_3Cl \cdot H_2O$
    C,67.03; H,7.65; N,3.13; Cl,7.91
Found    C,67.12; H,7.51; N,3.20; Cl,8.13

EXAMPLE 2

1.0 g of 6,6,9-trimethyl-9-azabicyclo [3,3,1] nonan-3β-ol, 2.4 g of methyl benzilate and 30 mg of metallic sodium are treated in the same manner as described in Example 1. 1.75 g of the benzilate of 6,6,9-trimethyl-9-azabicyclo [3,3,1] nonan-3β-ol hydrochloride are obtained. Yield: 75.4 percent The crystals thus obtained are recrystallized from a mixture of methanol and ether to give colorless fine needles. M.p. 175° C. (decomp.)

Infrared absorption spectrum (in nujol)
    3250 cm$^{-1}$(OH),   1735 cm$^{-1}$(ester)
Analysis calculated   for $C_{25}H_{32}NO_3Cl \cdot H_2O$
    C,67.03; H,7.65; N,3.13; Cl,7.91
Found    C,67.19; H,7.63; N,3.11; Cl,8.12

EXAMPLE 3

A mixture of 0.5 g of 6,6,9-trimethyl-9-azabicyclo [3,3,1] nonan-3α-ol, 0.88 g of methyl α-phenyl-α-(2-thienyl)-glycollate and 15 mg of metallic sodium is heated at 90° – 100° C. for about 3 hours under reduced pressure. After cooling, ether and 10 percent hydrochloric acid are added to the reaction mixture. The mixture is shaken. Precipitated crystals are then collected by filtration. 0.98 g of the α-phenyl-α-(2-thienyl)-glycollate of 6,6,9-trimethyl-9-azabicyclo [3,3,1] nonan-3α-ol are obtained. Yield: 82.7 percent The crystals thus obtained are recrystallized from ethanol to give colorless prisms. M.p. 235° – 236° C. (decomp.)

Infrared absorption spectrum (in nujol)
    3450 cm$^{-1}$(OH),   1715 cm$^{-1}$(ester)
Analysis calculated   for $C_{23}H_{30}NO_3SCl$
    C,63.36; H,6.94; N,3.21
Found    C,63.13; H,6.95; N,3.07

EXAMPLE 4

A mixture of 1.0 g of 6,6,9-trimethyl-9-azabicyclo [3,3,1] nonan-3β-ol, 1.8 g of methyl α-phenyl-α-(2-thienyl)-glycollate and 30 mg of metallic sodium is heated at 90° – 100° C. for 3 hours under reduced pressure. After cooling, ether is added to the reaction mixture. The mixture is then extracted with 10 percent hydrochloric acid. The aqueous layer is alkalified with sodium carbonate and re-extracted with ethylacetate. The extract is washed with water, dried and concentrated to dryness. The residue thus obtained is treated with hydrogen chloride by conventional manner. 1.31 g of the α-phenyl-α-(2-thienyl)-glycollate of 6,6,9-trimethyl-9-azabicyclo [3,3,1] nonan-3β-ol hydrochloride are obtained. Yield: 53.8 percent The crystals thus obtained are recrystallized from a mixture of ethanol and ether to give colorless prisms. M.p. 206° – 208° C. (decomp.)

Infrared absorption spectrum (in nujol)
    3200 cm$^{-1}$(OH),   1730 cm$^{-1}$(ester)
Analysis calculated   for $C_{23}H_{30}NO_3SCl$
    C,63.36; H,6.94; N,3.21
Found    C,63.27; H,7.09; N,3.10

EXAMPLE 5

A mixture of 0.5 g of 6,6,9-trimethyl-9-azabicyclo [3,3,1] nonan-3α-ol, 0.83 g of methyl α-phenyl-α-cyclohexyl-glycollate and 45 mg of sodium hydride (50 percent oil dispersion) is heated at 90° – 100° C. for about 3 hours under reduced pressure. After cooling, ether and 10 percent hydrochloric acid are added to the reaction mixture. The mixture is shaken. Precipitated crystals are then collected by filtration. 0.71 g of the α-phenyl-α-cyclohexyl-glycollate of 6,6,9-trimethyl-9-azabicyclo [3,3,1] nonan-3α-ol hydrochloride is obtained. Yield: 61.7 percent The crystals thus obtained are recrystallized from methanol to give colorless prisms. M.p. 238° – 240° C. (decomp.)

Infrared absorption spectrum (in nujol)
    3500 cm$^{-1}$(OH),   1720 cm$^{-1}$(ester)
Analysis calculated   for $C_{25}H_{38}NO_3Cl$
    C,68.86; H,8.78; N,3.21; Cl,8.13
Found    C,68.58; H,8.79; N,3.14; Cl,8.51

EXAMPLE 6

A mixture of 1.0 g of 6,6,9-trimethyl-9-azabicyclo [3,3,1] nonan-3α-ol, 1.67 g of methyl α-phenyl-α-cyclohexyl-glycollate and 90 mg of 50 percent oily sodium hydride is heated at 80° – 100° C. for about 3 hours under reduced pressure. After cooling, ether is added to the reaction mixture. The mixture is extracted with 10 percent hydrochloric acid. The aqueous layer is alkalified with sodium carbonate and re-extracted with ethyl acetate. The extract is washed with water, dried and concentrated to dryness. The residue thus obtained is treated with hydrogen chloride by conventional manner. 0.85 g of the α-phenyl-α-cyclohexyl-glycollate of 6,6,9-trimethyl-9-azabicyclo [3,3,1] nonan-3α-ol hydrochloride is obtained. Yield: 37 percent The crystals thus obtained are recrystallized from ethanol to give colorless prisms. M.p. 229° – 230° C. (decomp.)

Infrared absorption spectrum (in nujol)
    3400 cm$^{-1}$(OH),   1730 cm$^{-1}$(ester)
Analysis calculated   for $C_{25}H_{38}NO_3Cl$
    C,68.68; H,8.78; N,3.21; Cl,8.13
Found    C,69.18; H,8.88; N,3.21; Cl,7.90

EXAMPLE 7

A mixture of 1.0 g of 6,6-diethyl-9-methyl-9-azabicyclo [3,3,1] nonan-3α-ol, 2.1 g of methyl benzilate and 30 mg of metallic sodium is heated at 100° – 120° C. for about 5 hours under reduced pressure. After cooling, ether and 10 percent hydrochloric acid are added to the reaction mixture. The mixture is shaken. Precipitated crystals are then collected by filtration. 1.2 g of the benzilate of 6,6-diethyl-9-methyl-9-azabicyclo [3,3,1] nonan-3α-ol hydrochloride are obtained. Yield: 55.2 percent The crystals thus obtained are recrystallized from ethanol to give colorless needles. M.p. 222° – 223° C. (decomp.)

Infrared absorption spectrum (in nujol)
    3500 cm$^{-1}$(OH),   1715 cm$^{-1}$(ester)
Analysis calculated   for $C_{27}H_{36}NO_3Cl$
    C,70.80; H,7.92; N,3.06; Cl,7.74
Found    C,70.88; H,7.99; N,3.00; Cl,7.47

EXAMPLE 8

A mixture of 1.0 g of 6,6-diethyl-9-methyl-9-azabicyclo [3,3,1] nonan-3β-ol, 2.1 g of methyl benzilate and 30 mg of metallic sodium is treated in the same manner as is described in Example 7. 1.4 g of the benzilate of 6,6-diethyl-9-methyl-9-azabicyclo [3,3,1] nonan-3β-ol hydrochloride are obtained. Yield: 64.6 percent The crystals thus obtained are recrystallized from a mixture of ethanol and ether to give colorless needles. M.p. 197° – 200° C. (decomp.)

Infrared absorption spectrum (in nujol)
    3240 cm$^{-1}$(OH),     1735 cm$^{-1}$(ester)
Analysis calculated   for $C_{27}H_{36}NO_3Cl$
    C,70.80; H,7.92; N,3.06; Cl,7.74
Found     C,70.72; H,7.97; N,3.02; Cl,7.92

EXAMPLE 11

A mixture of 1.0 g of 6,6,9-trimethyl-9-azabicyclo [3,3,1] nonan-3α-ol, 2.93 g of methyl α,α-di-(2-thienyl)-glycollate and 45 mg of sodium hydride (50 percent oil dispersion) is heated at 110° – 120° C. for about 13 hours under reduced pressure. After cooling, ether and 10 percent hydrochloric acid are added to the reaction mixture. The mixture is shaken. Precipitated crystals are then collected by filtration. 1.15 g of the α,α-di-(2-thienyl)-glycollate of 6,6,9-trimethyl-9-azabicyclo [3,3,1] nonan-3α-ol hydrochloride are obtained. Yield: 47.6 percent The crystals thus obtained are recrystallized from ethanol to give colorless fine prisms. M.p. 233° – 234° C. (decomp.)

Infrared absorption spectrum (in nujol)
    3150 cm$^{-1}$(OH),     1730 cm$^{-1}$(ester)
Analysis calculated   for $C_{21}H_{28}NO_3S_2Cl$
    C,57.06; H,6.34; N,3.17
Found     C,56.98; H,6.49; N,3.30

EXAMPLE 12

A mixture of 1.0 g of 6,6,9-trimethyl-9-azabicyclo [3,3,1] nonan-3β-ol, methyl α,α-di-(2-thienyl)-glycollate and 30 mg of metallic sodium is heated at 80° – 90° C. for about 2 hours under reduced pressure. After cooling, ether is added to the reaction mixture. The mixture is extracted with 10% hydrochloric acid. The aqueous layer is alkalified with sodium carbonate and re-extracted with ethyl acetate. The extract is washed with water, dried and concentrated to dryness. The residue thus obtained is treated with hydrogen chloride by conventional manner. 2.0 g of the α,α-di-(2-thienyl)-glycollate of 6,6,9-trimethyl-9-azabicyclo [3,3,1] nonan-3β-ol hydrochloride are obtained. Yield: 83 percent The crystals thus obtained are recrystallized from ethanol to give colorless fine prisms. M.p. 185° – 187° C. (decomp.)

Infrared absorption spectrum (in nujol)
    3070 cm$^{-1}$(OH),     1720 cm$^{-1}$(ester)
Analysis calculated   for $C_{21}H_{28}NO_3S_2Cl$
    C,57.06; H,6.38; N,3.17
Found     C,56.87; H,6.49; N,3.34

EXAMPLE 13

A mixture of 1.0 g of 6,6-diethyl-9-methyl-9-azabicyclo [3,3,1] nonan-3α-ol, 2.55 g of ethyl α,α-di-(2-thienyl)-glycollate and 45 mg of sodium hydride (50 percent oil dispersion) is heated at 100° C. for about 9 hours under reduced pressure. After cooling, ether and 10 percent hydrochloric acid are added to the reaction mixture. The mixture is shaken. Precipitated crystals are then collected by filtration. 0.9 g of the α,α-di-(2-thienyl)-glycollate of 6,6-diethyl-9-methyl-9-azabicyclo [3,3,1] nonan-3α-ol is obtained. Yield: 40.3 percent The crystals thus obtained are recrystallized from ethanol to give colorless prisms. M.p. 215° – 217° C. (decomp.)

Infrared absorption spectrum (in nujol)
    3125 cm$^{-1}$(OH),     1720 cm$^{-1}$(ester)
Analysis calculated   for $C_{23}H_{32}NO_3S_2Cl$
    C,57.06; H,6.38; N,3.17
Found     C,56.98; H,6.49; N,3.30

EXAMPLE 14

A mixture of 0.5 g of 6,6-diethyl-9-methyl-9-azabicyclo [3,3,1] nonan-3β-ol, 1.1 g of methyl α,α-di-(2-thienyl)-glycollate and 15 mg of metallic sodium is heated at 90° C. for about 2 hours under reduced pressure. After cooling, ether is added to the reaction mixture. The mixture is extracted with 10 percent hydrochloric acid. The aqueous layer is alkalified with sodium carbonate and re-extracted with ethyl acetate. The extract is washed with water, dried and concentrated to dryness. The residue thus obtained is treated with hydrogen chloride by conventional manner. 0.82 g of the α,α-di-(2-thienyl)-glycollate of 6,6-diethyl-9-methyl-9-azabicyclo [3,3,1] nonan-3β-ol hydrochloride is obtained. Yield: 74 percent The crystals thus obtained are recrystallized from ethanol to give colorless prisms. M.p. 196° – 198° C. (decomp.)

Infrared absorption spectrum (in nujol)
    3150 cm$^{-1}$(OH),     1730 cm$^{-1}$(ester)
Analysis calculated   for $C_{23}H_{32}NO_3S_2Cl$
    C,58.76; H,6.86; N,2.98
Found     C58.95; H,6.86; N,2.97

EXAMPLE 15

A mixture of 1.05 g of 6,6-diethyl-9-methyl-9-azabicyclo [3,3,1] nonan-3α-ol, 1.96 g of ethyl α-phenyl-α-(2-thienyl)-glycollate and 90 mg of sodium hydride (50 percent oil dispersion) is heated at 80° C. for about 6 hours under reduced pressure. After cooling, ether and 10 hydrochloric acid are added to the reaction mixture. The mixture is shaken. Precipitated crystals are then collected by filtration. 0.95 g of the α-phenyl-α-(2-thienyl)-glycollate of 6,6-diethyl-9-methyl-9-azabicyclo [3,3,1] nonan-3α-ol hydrochloride is obtained. Yield: 41 percent The crystals thus obtained are recrystallized from ethanol to give colorless prisms. M.p. 217° – 219° C. (decomp.)

Infrared absorption spectrum (in nujol)
    3150 cm$^{-1}$(OH),     1720 cm$^{-1}$(ester)
Analysis calculated   for $C_{25}H_{34}NO_3SCl \cdot \frac{1}{3}H_2O$
    C,63.88; H,7.43; N,2.98
Found     C,63.94; H,7.42; N,3.02

EXAMPLE 16

A mixture of 2.1 g of 6,6-diethyl-9-methyl-9-azabicyclo [3,3,1] nonan-3β-ol, 3.4 g of ethyl α-phenyl-α-(2-thienyl)-glycollate and 180 mg of sodium hydride (50 percent oil dispersion) is heated at 80° C. for about 6 hours under reduced pressure. After cooling, ether is added to the reaction mixture. The mixture is extracted with 10 percent hydrochloric acid. The aqueous layer is alkalified with sodium carbonate and re-extracted with sodium acetate. The extract is washed with water, dried and concentrated to dryness. The residue thus obtained is treated with hydrogen chloride by conventional manner. 1.2 g of the α-phenyl-α-(2-thienyl)-glycollate of 6,6-diethyl-9-azabicyclo [3,3,1] nonan-3β -ol hydrochloride are obtained. Yield: 26.8 percent The crystals thus obtained are recrystallized from ethanol to give colorless prisms. M.p. 188° – 190° C. (decomp.)

Infrared absorption spectrum (in nujol)
    3150 cm$^{-1}$(OH),     1730 cm$^{-1}$(ester)
Analysis calculated   for $C_{25}H_{34}NO_3SCl$
    C,64.70; H,7.38; N,3.02
Found     C,64.30; H,7.49; N,3.04

EXAMPLE 17

A mixture of 1.0 g of 6,6,9-trimethyl-9-azabicyclo [3,3,1] nonan-3α-ol, methyl α-cyclohexyl-α-(2-thienyl)-glycollate and about 30 mg of metallic sodium is heated at 90° C. for about 6 hours under reduced pressure. After cooling, ether and 10 percent hydrochloric acid are added to the reaction mixture. The mixture is shaken. Precipitated crystals are then collected by filtration. 1.45 g of the α-cyclohexyl-α-(2-thienyl)-glycollate of 6,6,9-trimethyl-9-azabicyclo [3,3,1] nonan-3α-ol hydrochloride are obtained. Yield: 59.7 percent The crystals thus obtained are recrystallized from ethanol to give colorless prisms. M.p. 238° – 239° C. (decomp.)

Infrared absorption spectrum (in nujol)
      3400 cm$^{-1}$(OH),     1715 cm$^{-1}$(ester)
Analysis calculated     for $C_{23}H_{36}NO_3SCl$
    C,62.49; H,8.21; N,3.17
Found     C,62.13; H,8.15; N,3.29

EXAMPLE 18

A mixture of 1.0 g of 6,6,9-trimethyl-9-azabicyclo [3,3,1] nonan-3β-ol, 2.88 g of methyl α-cyclohexyl-α-(2-thienyl)-glycollate and about 30 mg of metallic sodium is heated at 90° C. for about 10 hours under reduced pressure. After cooling, ether is added to the reaction mixture. The mixture is extracted with 10 percent hydrochloric acid. The aqueous layer is alkalified with sodium carbonate and re-extracted with ethyl acetate. The extract is washed with water, dried and concentrated to dryness. The residue thus obtained is treated with hydrogen chloride by conventional manner. 1.55 g of the α-cyclohexyl-α-(2-thienyl)-glycollate of 6,6,9-trimethyl-9-azabicyclo [3,3,1] nonan-3β-ol hydrochloride are obtained. Yield: 64 percent The crystals thus obtained are recrystallized from ethanol to give colorless prisms. M.p. 224° – 226° C. (decomp.)

Infrared absorption spectrum (in nujol)
      3350 cm$^{-1}$(OH),     1730 cm$^{-1}$(ester)
Analysis calculated     for $C_{23}H_{36}NO_3SCl$
    C, 62.49; H,8.21; N,3.17
Found     C,62.48; H,8.21; N,3.13

EXAMPLE 19

A mixture of 1.0 g of 6,6-diethyl-9-methyl-9-azabicyclo [3,3,1] nonan-3α-ol, 2.5 g of methyl α-cyclo-hexyl-α-(2-thienyl)-glycollate and about 30 mg of metallic sodium is heated at 80° – 90° C. for about 5 hours under reduced pressure. After cooling, ether and 10 percent hydrochloric acid are added to the reaction mixture. The mixture is shaken. Precipitated crystals are then collected by filtration. 1.1 g of the α-cyclohexyl-α-(2-thienyl)-glycollate of 6,6-diethyl-9-methyl-9-azabicyclo [3,3,1] nonan-3α-ol hydrochloride are obtained. Yield: 50 percent The crystals thus obtained are recrystallized from a mixture of ethanol and ether to give colorless prisms. M.p. 228° – 229° C. (decomp.)

Infrared absorption spectrum (in nujol)
      3550 cm$^{-1}$(OH),     1710 cm$^{-1}$(ester)
Analysis calculated     for $C_{25}H_{40}NO_3SCl$
    C,63.87; H,8.58; N,2.98
Found     C,63.80; H,8.62; N,3.03

EXAMPLE 20

A mixture of 2.0 g of 6,6-diethyl-9-methyl-9-azabicyclo [3,3,1] nonan-3β-ol, 4.8 g of methyl α-cyclohexyl-α-(2-thienyl)-glycollate and about 60 mg of metallic sodium is heated at 90° C. for about 12 hours under reduced pressure. After cooling, ether is added to the reaction mixture. The mixture is extracted with 10 percent hydrochloric acid. The aqueous layer is alkalified with sodium carbonate and re-extracted with ethyl acetate. The extract is washed with water, dried and concentrated to dryness. The residue thus obtained is treated with hydrogen chloride by conventional manner. 2.97 g of the α-cyclohexyl-α-(2-thienyl)-glycollate of 6,6-diethyl-9-methyl-9-azabicyclo [3,3,1] nonan-3β-ol hydrochloride are obtained. Yield: 66.6 percent.

The crystals thus obtained are recrystallized from a mixture of ethanol and petroleum ether to give colorless prisms. M.p. 214°–216° C. (decomp.)

Infrared absorption spectrum (in nujol)
      3500 cm$^{-1}$(OH),     1715 cm$^{-1}$(ester)
Analysis calculated     for $C_{25}H_{40}NO_3SCl$
    C,63.87; H,8.58; N,2.98
Found     C,63.77; H,8.63; N,3.24

We claim:
1. A compound of the formula:

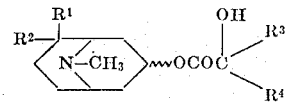

wherein each of $R^1$ and $R^2$ is methyl or ethyl radical, $R^3$ is phenyl or 2-thienyl radical and $R^4$ is phenyl, 2-thienyl or cyclohexyl radical, or a pharmaceutically acceptable acid addition salt thereof.

2. Benzilate of 6,6,9-trimethyl-9-azabicyclo[3.3.1] nonan-3β-ol or a pharmaceutically acceptable acid addition salt thereof.

3. α-Phenyl-α-(2-thienyl)-glycolate of 6,6,9-trimethyl-9-azabicyclo[3.3.1]nonan-3α-ol or a pharmaceutically acceptable acid addition salt thereof.

4. α-Phenyl-α-cyclohexyl-glycolate of 6,6,9-trimethyl-9-azabicyclo[3.3.1]nonan-3α-ol or a pharmaceutically acceptable acid addition salt thereof.

5. α-Phenyl-α-cyclohexyl-glycolate of 6,6,9-trimethyl-9-azabicyclo[3.3.1]nonan-3β-ol or a pharmaceutically acceptable acid addition salt thereof.

6. Benzilate of 6,6-diethyl-9-methyl-9-azabicyclo [3.3.1] nonan-3α-ol or a pharmaceutically acceptable acid addition salt thereof.

7. Benzilate of 6,6-diethyl-9-methyl-azabicyclo[3.3.1] nonan-3β-ol or a pharmaceutically acceptable acid addition salt thereof.

8. α,α-di-(2-thienyl)-glycolate of 6,6,9-trimethyl-9-azabicyclo[3.3.1]nonan-3β-ol or a pharmaceutically acceptable acid addition salt thereof.

9. α,α-di-(2-thienyl)-glycolate of 6,6-diethyl-9-methyl-9-azabicyclo[3.3.1]nonan-3α-ol or a pharmaceutically acceptable acid addition salt thereof.

10. α,α-di-(2-thienyl)-glycolate of 6,6-diethyl-9-methyl-9-azabicyclo[3.3.1]nonan-3β-ol or a pharmaceutically acceptable acid addition salt thereof.

11. α-Phenyl-α-(2-thienyl)-glycolate of 6,6-diethyl-9-methyl-9-azabicyclo[3.3.1]nonan-3β-ol or a pharmaceutically acceptable acid addition salt thereof.

12. α-(2-thienyl)-α-cyclohexyl-glycolate of 6,6,9-trimethyl-9-azabicyclo[3.3.1]nonan-3α-ol or a pharmaceutically acceptable acid addition salt thereof.

13. α-(2-thienyl)-α-cyclohexyl-glycolate of 6,6,9-trimethyl-9-azabicyclo[3.3.1]nonan-3β-ol or a pharmaceutically acceptable acid addition salt thereof.

14. α-(2-thienyl)-α-cyclohexyl-glycolate of 6,6-diethyl-9-methyl-9-azabicyclo[3.3.1]nonan-3β-ol or a pharmaceutically acceptable acid addition salt thereof.

* * * * *